E. M. SWIFT.
SINGLE TRUCK CAR.
APPLICATION FILED JUNE 21, 1918.
1,300,787.
Patented Apr. 15, 1919.
2 SHEETS—SHEET 1.
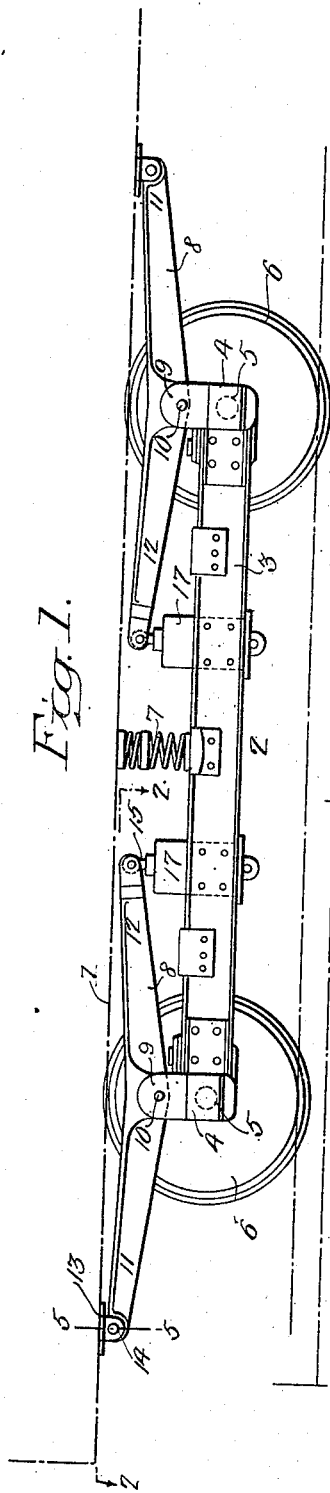
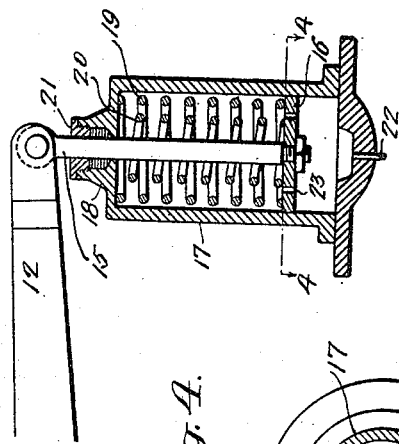
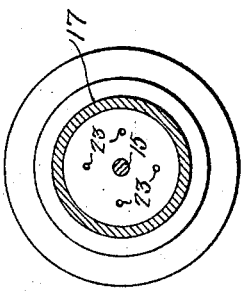
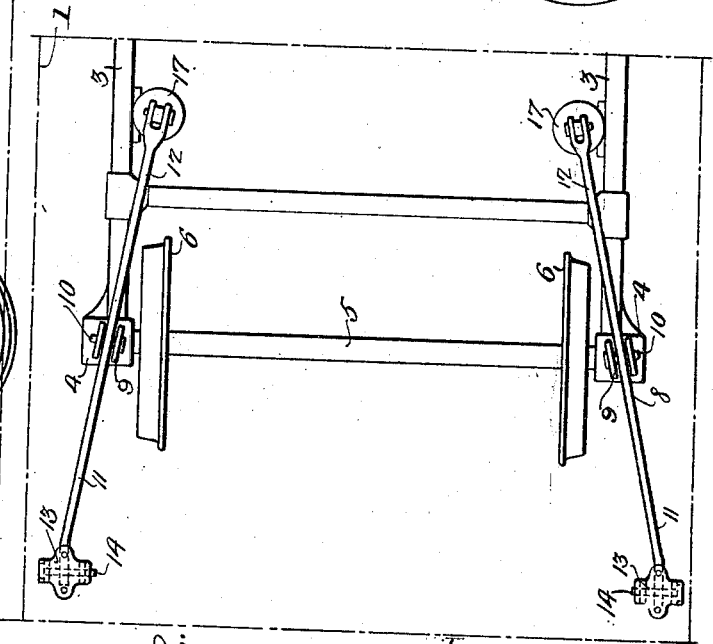
Inventor:
Edwin M. Swift,
by his Attorneys,
Howson & Howson E. M. SWIFT.
SINGLE TRUCK CAR.
APPLICATION FILED JUNE 21, 1918.
1,300,787.
Patented Apr. 15, 1919.
2 SHEETS—SHEET 2.
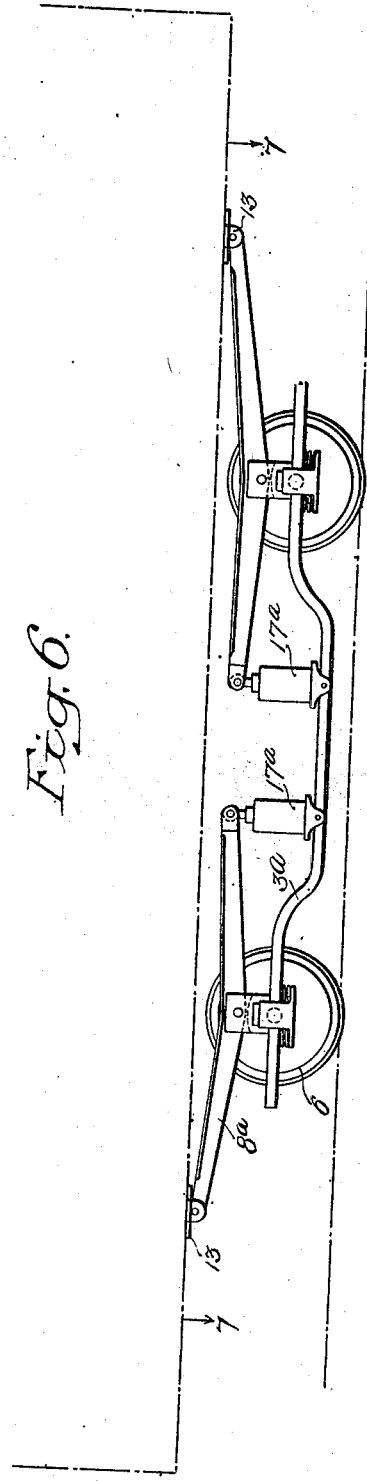
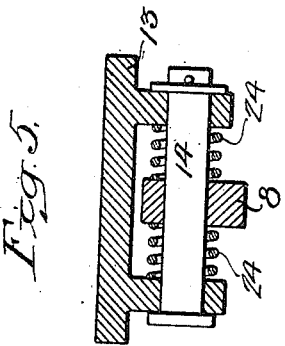
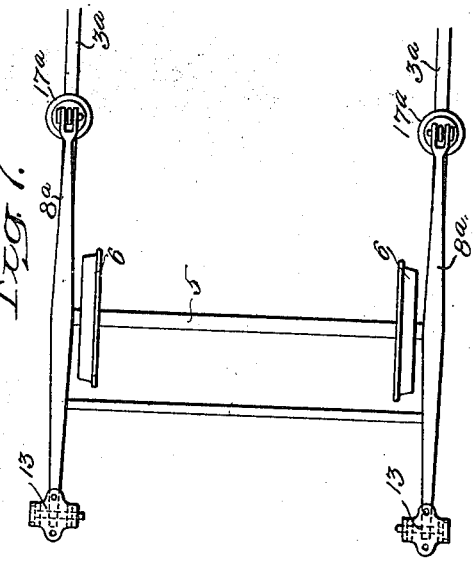
Inventor,
Edwin M. Swift,
by his Attorneys

UNITED STATES PATENT OFFICE.

EDWIN M. SWIFT, OF SEATTLE, WASHINGTON.

SINGLE-TRUCK CAR.

1,300,787. Specification of Letters Patent. Patented Apr. 15, 1919.

Application filed June 21, 1918. Serial No. 241,191.

*To all whom it may concern:*

Be it known that I, EDWIN M. SWIFT, a citizen of the United States, and a resident of Seattle, county of King, State of Washington, have invented certain Improvements in Single-Truck Cars, of which the following is a specification.

One object of my invention is to improve the riding qualities of the type of street railway cars known as a "single truck car," in which the truck is connected to the car body without center pins or pivots.

A further object of the invention is to provide means to allow for the side easement of the car body when passing around curves, &c.

In the accompanying drawings:—

Figure 1, is a side view of the truck mounted under the car body;

Fig. 2, is a plan view of the truck on the line 2—2, Fig. 1;

Fig. 3, is an enlarged sectional view of the cylinder forming a dash pot;

Fig. 4, is a sectional view on the line 4—4, Fig. 3;

Fig. 5, is an enlarged sectional view on the line 5—5, Fig. 1;

Fig. 6, is a side view illustrating a modification of the invention; and

Fig. 7, is a plan view of the truck on the line 7—7, Fig. 6.

Referring to the drawings, 1 is the body of the car, which may be of any suitable construction. 2 is the truck having side beams 3, at each end of which are the boxes 4 for the two axles 5 on which are mounted the wheels 6. This type of car is known as a "single truck car," the length of the wheel base being comparatively short so that the wheels can pass around curves without pivoting the truck to the car body. 7 is the usual center spring used on this type of car truck, the spring being located between the body of the car and the side beams 3 at each side of the car.

In order to yieldingly support the ends of the car body beyond the ends of the truck, I provide beams or levers 8 pivoted to the extensions 9 of the boxes by pins 10. One arm 11 of each beam 8 is connected to a bearing 13 by means of a transverse pin 14. The other arm 12 of each beam is connected to a rod 15 of a piston 16 mounted in a cylinder 17 forming a dash pot. The cylinder is secured to the truck frame in any suitable manner.

Mounted between the piston 16 and the upper end 18 of the cylinder 17 are two coiled springs 19 and 20, one located within the other, and one being stronger than the other. At the upper end of the cylinder, in the present instance, is a stuffing box 21 through which the rod 15 extends, and in the bottom of the cylinder is a small opening 22, closed by a plug. The piston 16 has four perforations 23 therein, but it will be understood that the number of these perforations may be varied, as desired. The cylinder contains oil, or other fluid, and when the car is in motion the springs 19 and 20 support the load, together with the central spring 7, and the abrupt action of the springs is resisted by the fluid in the cylinder, as this fluid must pass through the perforations in the piston. This construction allows for the easy riding of the truck.

The outer ends 11 of the levers 8, as before remarked, are pivoted to the bearings 13 by transverse pivots 14, clearly shown in the enlarged view, Fig. 5, and the bearing is much wider than the beam or lever 8, and located between each side of the beam and the bearing is a coiled spring 24. These springs allow for the side easement of the car body when the car passes around curves. The beams 8 are arranged at an angle, as clearly shown in Fig. 2. This allows for the attachment of the beams to the car body near the sides and at a considerable distance beyond the wheels, and also allows for the location of the cylinders 17 within the truck frames so that they are protected and not liable to be injured.

In Figs. 6 and 7, I have shown another type of single truck car, in which the side beams 3ª are depressed at the center and the dash pot 17ª rests directly on the beams. In this instance, the pivoted beams 8ª are arranged parallel with the sides of the car, as clearly shown in the drawings.

I claim:—

1. The combination in a single truck car, of a car body; a four-wheeled truck mounted under the car body; beams pivoted to the truck directly above the boxes for the axles, one arm of each beam being pivoted to the car body beyond the wheels, the other end of each beam being independently connected through a spring to the frame of the truck so that each beam will operate independently of the others.

2. The combination in a single truck car, of a car body; a four wheeled truck frame mounted under the car body and having boxes for the axles; beams pivoted to the boxes, one arm of each beam extending beyond the wheels and pivoted to the car body, the other arm of the beam being connected to a rod having a piston; a cylinder in which the piston is mounted; and springs between the piston and the upper end of the cylinder, said cylinder being secured to the truck frame.

3. The combination in a car body, of a four wheeled truck frame mounted under the car body; boxes at each end of the frame for the axles; beams pivoted to the truck frame directly above the axles, one arm of each beam extending beyond the wheels of the truck and secured to the under side of the car body, the other arm extending toward the center of the truck; a rod to which the said arm is connected; a perforated piston connected to the said arm; a cylinder in which the piston is mounted; and coiled springs between the piston and the upper end of the cylinder, said springs yieldingly supporting the car body.

4. The combination in a car body, of a four wheeled truck having side beams and boxes at each end of the beams; diagonally arranged beams pivoted to the truck above the boxes, one arm of each beam extending beyond the wheels and pivotally connected to the car body; a cylinder located on the inside of the side beams of the truck between the wheels; a piston in the cylinder; a rod secured to the piston and connected to one arm of each of said levers, said levers being diagonally arranged in respect to the center line of the truck.

5. The combination of a car body; a four wheeled truck mounted on the car body; four beams pivoted to the truck; means connected to the inner ends of each beam for yieldingly supporting the car body; a bearing on the car body to which the outer end of each lever is pivotally connected; and a spring between each side of the lever and the bearing, which allows for the side easement of the car body.

In witness whereof I affix my signature.

EDWIN M. SWIFT.

Copies of this patent may be obtained for five cents each, by addressing the "Commissioner of Patents, Washington, D. C."